United States Patent

Glueck et al.

[11] Patent Number: 6,143,189
[45] Date of Patent: Nov. 7, 2000

[54] METHOD FOR PRODUCING LIQUID CRYSTAL CELLS

[75] Inventors: Joachim Glueck, Renningen; Stefan Kaefer, Stuttgart, both of Germany

[73] Assignee: Robert Bosch GmbH, Stuttgart, Germany

[21] Appl. No.: 09/180,653

[22] PCT Filed: Mar. 5, 1998

[86] PCT No.: PCT/DE98/00658

§ 371 Date: Aug. 27, 1999

§ 102(e) Date: Aug. 27, 1999

[87] PCT Pub. No.: WO98/40782

PCT Pub. Date: Sep. 17, 1998

[30] Foreign Application Priority Data

Mar. 17, 1997 [DE] Germany .......................... 197 10 401

[51] Int. Cl.[7] ................................................ G02F 1/1333
[52] U.S. Cl. .............................. 216/23; 216/51; 216/52; 216/67
[58] Field of Search ................... 216/23, 24, 51, 216/52, 67; 438/30, 33

[56] References Cited

U.S. PATENT DOCUMENTS

| | | | |
|---|---|---|---|
| 4,094,058 | 6/1978 | Kiso et al. | 29/592 R |
| 4,729,971 | 3/1988 | Coleman | 437/226 |
| 5,185,059 | 2/1993 | Nishida et al. | 216/23 |
| 5,278,685 | 1/1994 | Takanashi et al. | 359/82 |
| 5,340,491 | 8/1994 | Enomoto et al. | 216/23 |
| 5,492,582 | 2/1996 | Ide et al. | 156/106 |
| 5,851,411 | 12/1998 | An et al. | 216/23 |
| 5,891,597 | 4/1999 | Lee | 216/23 |

FOREIGN PATENT DOCUMENTS

| | | |
|---|---|---|
| 436 387 | 7/1991 | European Pat. Off. . |
| 41 33 150 | 4/1993 | Germany . |
| 1-026821 | 1/1989 | Japan . |

OTHER PUBLICATIONS

**Prolonge et al., "Simplest Process Color TFT–LCDs", Asia Display '95, pp. 697–700, 1995.

*Primary Examiner*—Randy Gulakowski
*Assistant Examiner*—Anita Alanko
*Attorney, Agent, or Firm*—Kenyon & Kenyon

[57] ABSTRACT

A method for manufacturing a gelatin-coated glass panel is described. In this, gelatin is first applied onto a glass panel, then a protective layer is sputtered on through a mask placed onto the gelatin layer. After removal of the mask, the gelatin can be removed, with the aid of a dry etching method, from the regions in which it is not equipped with a protective layer. The glass panel can then easily be divided by scoring and breaking. The method makes it possible to produce, on a large-scale production basis, liquid crystal displays which have either a color filter or a black matrix made of photo-emulsion.

16 Claims, 3 Drawing Sheets

METHOD FOR PRODUCING LIQUID CRYSTAL CELLS

FIELD OF THE INVENTION

The present invention relates to a method for manufacturing a liquid crystal cell, and on a method for manufacturing panels.

BACKGROUND INFORMATION

A method for manufacturing a liquid crystal cells is described in the article "Simplest Process Color TFT LCDs." The liquid crystal cell consists of two glass panels which are adhesively bonded together at a small spacing from one another which is maintained by spacers. The liquid crystal is located between these glass panels. One of the glass panels is coated on the inside of the liquid crystal cell with one or more photoemulsion layers.

It is also know in the art, although a color pigment coating is used instead of the photoemulsion, to manufacture several liquid crystal cells on a large glass panel, which at the end of the manufacturing process is scored and broken.

Breaking the glass panel coated with the photoemulsion is problematic, however, which complicates mass production of liquid crystal cells having a photoemulsion coating. The photoemulsion usually consists of a relatively thick (for example 16 micrometers) gelatin layer which detaches over large areas when the glass is broken. Since gelatin is moreover moisture-sensitive, cutting using a water jet is also impossible.

SUMMARY OF THE INVENTION

The method according to the present invention has the advantage that several gelatin-coated glass panels can be manufactured in a single process pass. On the one hand, production is thereby made simpler and also cheaper, and on the other hand, fluctuations in production quality are also reduced. The method according to the present invention makes possible the manufacture of liquid crystal cells with color filters made of photoemulsion, or also with black matrix made of photoemulsion, in large volumes and thus more economically.

For example, production of the preset break point by scoring is particularly advantageous because computer numerically controlled machines which already exist can be utilized for this separation method.

Glass advantageously combines favorable mechanical properties, since it can be parted by scoring and breaking, and favorable optical properties, since it can be manufactured with very low absorption coefficients. In addition, glass is chemically inert and can be equipped with a plurality of coatings.

Sputtering of the protective layer represents a relatively economical thin-film technique, and therefore leads to a further decrease in manufacturing cost.

The use of indium-tin oxide as the protective layer advantageously yields a layer which, in addition to its protective function, is both electrically conductive and optically transparent. The protective layer can thus perform a dual function as protective layer and electrode.

It is particularly advantageous to ablate the gelatin layer with the aid of reactive ion etching using $O_2$—Ar—$SF_6$, since this process step on the one hand guarantees thorough removal of the gelatin in the exposed regions, but at the same time does not also affect the edge region of the gelatin that is not intended to be ablated. Very sharp edges without underetching are thus produced.

Lastly, it is advantageous to apply an orientation layer onto the protective layer, since a liquid crystal to be introduced into the liquid crystal cell thereby receives a precisely defined preferred direction.

BRIEF DESCRIPTION OF THE DRAWINGS

FIG. 1 depicts a panel, for example glass.

FIG. 2 depicts formation of a gelatin layer.

FIG. 3 depicts formation of a mask on the gelatin layer and then deposition of ITO.

FIG. 4 depicts removal of the mask and then etching of the gelatin layer using ITO as an etch mask.

FIG. 5 depicts the resulting etched panel.

FIG. 6 depicts dividing the panel into individual segments.

FIG. 8 depicts a panel with spacers and beads of adhesive.

FIG. 9 depicts an arrangement with a top panel joined to the panel shown in FIG. 8.

FIG. 10 depicts dividing the arrangement of panels.

DETAILED DESCRIPTION

Figure 1:
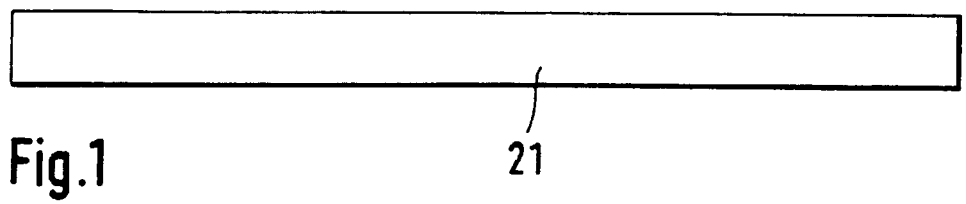
FIGS. 1–6 show steps of a method for manufacturing a gelatin-coated panel according to the present invention.

A precursor panel 21 which is made of a brittle material, for example glass, is visible in FIG. 1.

Figure 2:
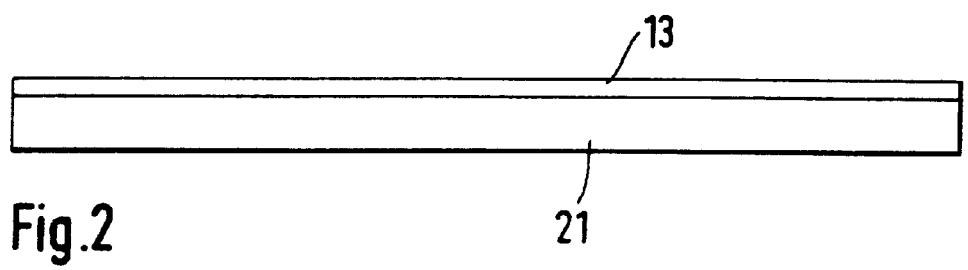

Precursor panel 21 is equipped with a gelatin layer 13. FIG. 2 shows precursor panel 21 after this process step.

Figure 3:
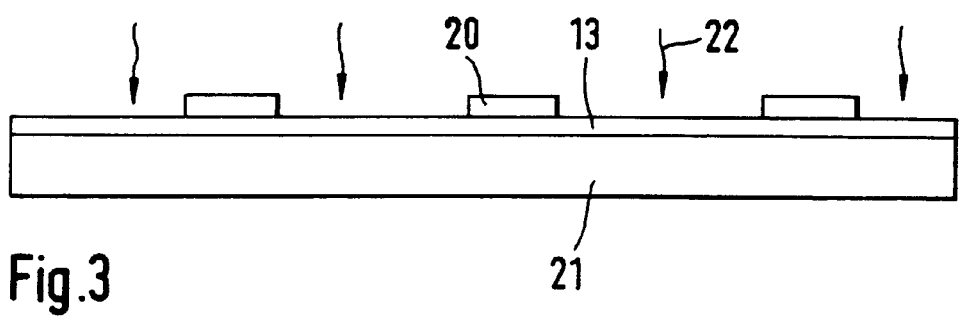

FIG. 3 shows that a mask 20 has been placed onto precursor panel 21 equipped with a gelatin layer 13. Mask 20 used in this exemplary embodiment has, in the exemplary embodiment selected here, bars which are arranged in a rectangular grid, as well as openings which are approximately in the shape of rectangles. A protective layer is then sputtered onto gelatin layer 13 through the openings of mask 20.

"Sputtering" is understood by the person skilled in the art to be the atomization of solids by ion bombardment. A substrate—which in the exemplary embodiment selected here consists of indium-tin oxide, and is not depicted in FIG. 3—is bombarded with an ion beam so that sputtered indium-tin oxide 22 can accumulate on gelatin layer 13 and mask 20.

Figure 4:
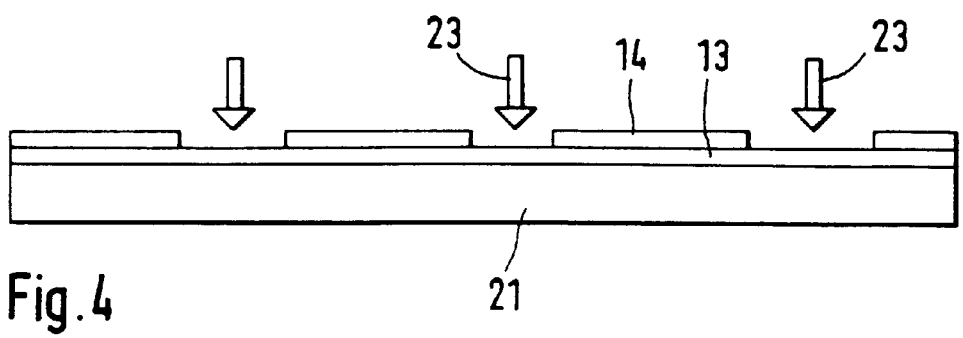

In the next process step, mask 20 is removed so as to leave behind a precursor panel 21 which is coated with a gelatin layer 13 which in turn is equipped with approximately rectangular segments of protective layer 14. This is shown in FIG. 4. An etching gas stream 23 is then directed onto this gelatin layer 13 equipped with the patterned protective layer 14.

Etching gas stream 23 consists, for example, of an $O_2$Ar—$SF_6$ gas mixture, which does not attack protective layer 14 consisting of indium-tin oxide, but does ablate gelatin 13 in the regions in which it is not covered by protective layer 14. Other gas mixtures are also conceivable, but it must be remembered in this context that gelatin is water-sensitive, and swells in contact with water.

Figure 5:
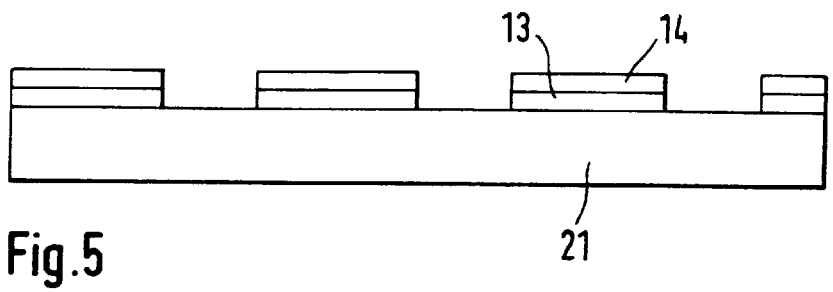

FIG. 5 shows precursor panel 21 after completion of the etching step. Precursor panel 21 is equipped with gelatin layers 13, patterned in approximately rectangular fashion, which are covered by protective layers 14 also patterned in approximately rectangular fashion.

Figure 6:
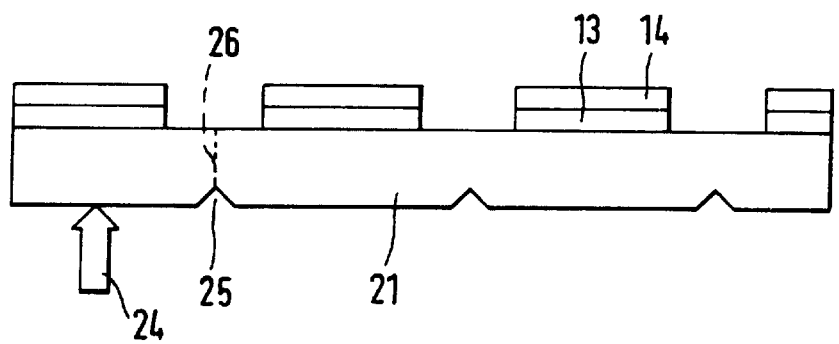

In the last process step shown in FIG. 6, precursor panel 21 is divided into individual segments, each segment having a rectangular multi-layer structure made up of gelatin layer 13 and protective layer 14. This division follows along break lines 26. Division of precursor panel 21 is accomplished by scoring the precursor panel along break lines 26, thus creating a preset break point 25. Precursor panel 21 is then divided by abruptly applying a force 24.

The method according to the present invention has been illustrated with reference to a glass panel coated with gelatin. The relevance of the method lies in the fact that gelatin represents the carrier and binder material for photoemulsion, and largely determines its mechanical properties. The photoemulsion in turn is used to make certain production steps in the field of liquid crystal cell production particularly efficient, as mentioned in the documents of the existing art cited initially.

If materials other than gelatin should be available for the manufacture of photoemulsion, the method is of course also intended for them.

On the other hand, the method is also suitable, for example, for more efficient manufacture of photographic plates.

In the exemplary embodiment shown FIG. 6, mask 20 is composed of a plate which is patterned by way of a milling cutter. The accuracy attained thereby is sufficient for the intended use in a liquid crystal display.

Figure 7:
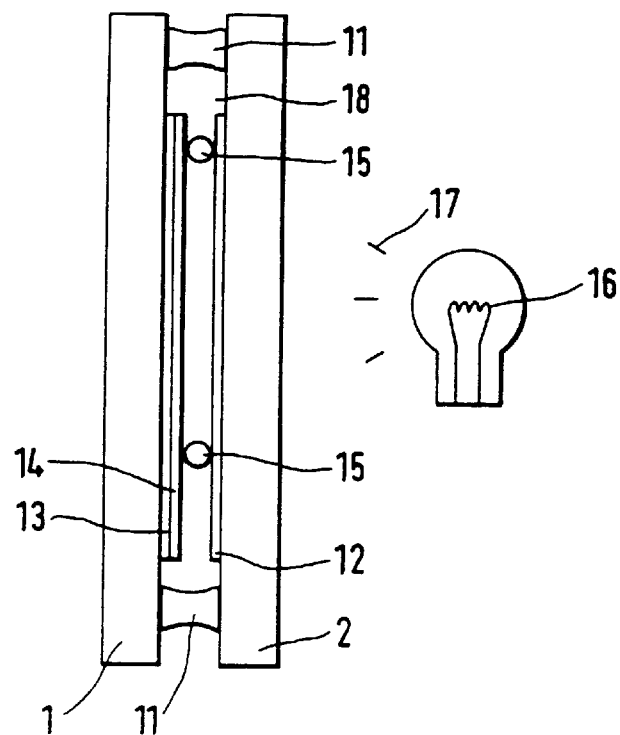
FIG. 7 shows a liquid crystal cell.

A liquid crystal display, in which the glass panel coated with gelatin and a protective layer is used, is shown in FIG. 7. In this context, reference characters identical to those in FIG. 1 through 6 refer to identical constituents.

The liquid crystal cell includes a first panel 1 and a second panel 2 which are arranged parallel to one another. First panel 1 is equipped, on its side facing second panel 2, with a gelatin layer 13, which in turn is equipped with a protective layer 14. The lateral dimensions of gelatin layer 13 and of protective layer 14 are somewhat smaller than those of first panel 1, so that an edge region of first panel 1 on the surface facing second panel 2 remains uncoated. Second panel 2 is equipped, on its side facing first panel 1, with a conductive coating 12. The lateral dimensions of conductive coating 12 are also somewhat less than the lateral dimensions of second panel 2, which in turn possesses the same lateral dimensions as first panel 1. First panel 1 and second panel 2 are joined to one another by a layer of adhesive 11. Adhesive 11 is applied in the region of the first and second panels in which one of coatings 12, 13, 14 is present. To prevent protective layer 14 and conductive coating 12 from touching one another, spacers 15—which are composed of, for example, of short fragments of a glass fiber—are located between them. The adhesive can also be mixed with the spacers. There is thus created, between first panel 1 and second panel 2, a cavity 18 which is sealed between the two panels 1, 2 by adhesive 11. The liquid crystal is located in this cavity 18. The constituents described so far constitute the liquid crystal cell. The liquid crystal cell can be used as a liquid crystal display by equipping it, for example, with an illumination unit 16 which emits light 17 that is either transmitted by the liquid crystal cell or reflected from it. Additional optical films and mechanical components can also be provided if applicable, although they are not relevant to the present invention.

Figure 8:
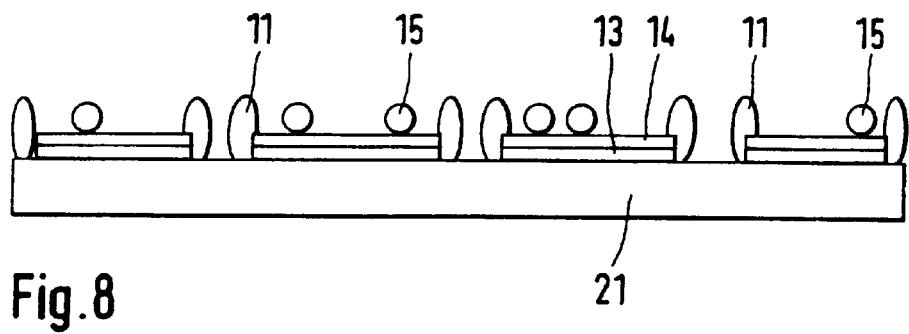
FIGS. 8–10 show steps of a method for manufacturing a liquid crystal cell according to the present invention.

The manner in which a liquid crystal display as depicted in FIG. 7 can be manufactured with the aid of the method depicted in FIGS. 1 through 5 will now be shown. A liquid crystal cell is manufactured using precursor panel 21 depicted in FIG. 5, on which is located gelatin layer 13 patterned into rectangles, which in turn is covered by a protective layer patterned in the same form. Short fragments of a glass fiber, which serve as spacers 15, are scattered through this arrangement. Beads of adhesive are also applied onto precursor panel 21, each bead almost completely enclosing a rectangle of gelatin and protective film. In order to allow the introduction of the liquid crystal in a subsequent process step, it is advisable to configure the bead in the form of a not entirely closed rectangle. FIG. 8 shows precursor panel 21 after the completion of these two process steps, which can be accomplished in any order.

Adhesive 11 is advantageously but not necessarily arranged so that it partially covers the surface coated with photoemulsion, and partially the surface having no photoemulsion. It thus effectively protects the lateral surfaces from moisture.

Figure 9:
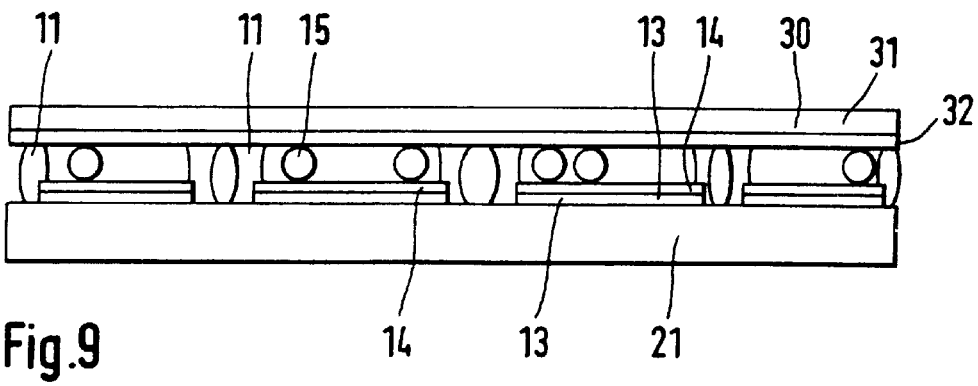

In the next process step, a top precursor panel 30 is lowered onto the arrangement including precursor panel 21, gelatin layer 13, protective layer 14, spacers 15, and adhesive 11. Top precursor panel 30 is configured, in this context, as a thin glass panel 31 which is equipped with a continuous indium-tin oxide layer 32. FIG. 9 shows the arrangement resulting after this process step.

Figure 10:
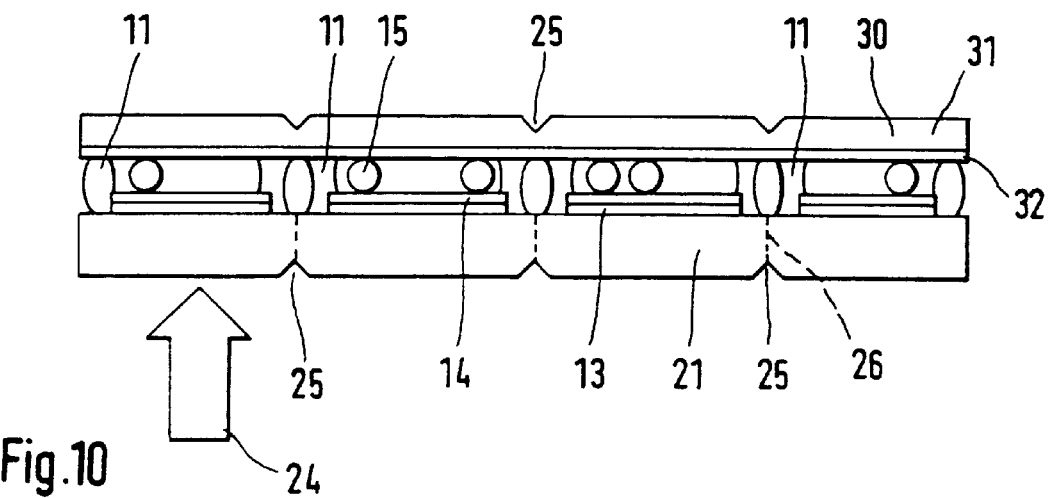

FIG. 10 shows how the arrangement created in FIG. 9, made up of precursor panel 21 with gelatin layer 13 and protective layer 14, joined with adhesive 11 and spacers 15 to top precursor panel 30, is divided. For this purpose, by analogy with FIG. 6, precursor panel 21 and top precursor panel 30 are equipped with preset break points 25 by scoring. By abrupt application of a force 24, the arrangement can be broken along break lines 26 defined by preset break points 25.

A liquid crystal cell similar to that in FIG. 7 is thereby obtained, the fragments of precursor panel 21 constituting first panel 1, and the fragments of top precursor panel 30 constituting second panel 2 of conductive coating 12.

The liquid crystal cells resulting from division of the arrangement shown in FIG. 10 have, in contrast to the liquid crystal cell depicted in FIG. 7, a coating on second panel 2 whose lateral dimensions are exactly the same size as those of second panel 2 itself. Both size relationships are possible and provided for, and are not intended to be relevant to the invention.

It is also possible and provided for to apply onto at least one of the two panels an orientation layer which serves to impart a stable orientation to the liquid crystal. This can consist, for example, of polyimide which is textured on the surface by suitable means. When this orientation layer is applied, after removal of the mask, onto the previously etched gelatin layer that is coated with the protective layer, the additional advantage is obtained that the edges of the gelatin layer are protected from environmental influences, in particular moisture.

Lastly, it is possible and provided for to construct an active matrix display using a liquid crystal cell that was manufactured with the method according to the present invention. In this context, oxide layer 32 is replaced by a matrix-like arrangement of switching elements, for example thin-film transistors or diodes, activated via column and row conductors. The matrix serves in this context for selective addressing of discrete image electrodes made of indium-tin oxide.

What is claimed is:

1. A method for manufacturing a panel comprising the steps of:
   applying a gelatin coating onto a precursor panel, the precursor panel being divided along at least one break line;
   placing a mask onto the gelatin coating, the mask including at least one bar arranged to cover the at least one break line;
   applying a protective layer onto regions of the gelatin coating which are not covered by the at least one bar, the protective layer being composed of a conductive, transparent material;
   removing the mask;
   removing via dry etching an entire thickness of the gelatin coating from regions which are not covered by the protective layer;
   equipping the precursor panel with a predetermined break point along the at least one break line; and
   breaking the precursor panel along the at least one break line.

2. The method according to claim 1, further comprising the step of:
   producing the predetermined break point using a scoring procedure.

3. The method according to claim 1, wherein the panel is composed of a glass material.

4. The method according to claim 1, wherein the step of applying the protective layer includes the step of sputtering the protective layer.

5. The method according to claim 1, wherein the protective layer is composed of an indium-tin oxide material.

6. The method according to claim 1, wherein the dry etching is performed by a reactive ion etching using an $O_2$—Ar—$SF_6$ gas mixture.

7. A method for manufacturing an arrangement, the arrangement including a liquid crystal cell, a first panel, a second panel and a spacer, the arrangement being divided along break lines, the method comprising the steps of:
   coating a first side of the first panel with a gelatin coating;
   placing a mask onto the gelatin coating, the mask including at least one bar arranged to cover the at least one break line;
   applying a protective layer onto regions of the gelatin coating which are not covered by the at least one bar, the protective layer composed of a conductive, transparent material;
   removing the mask;
   removing via dry etching an entire thickness of the gelatin coating from regions which are not covered by the protective layer;
   joining the first panel to the second panel and the spacer to form the arrangement so that a first break line of the first panel is arranged opposite to a second break line of the second panel, the spacer being positioned between the first and second panels;
   equipping the first and second panels with a predetermined break point along the first break line and the second break line; and
   braking the arrangement along the first break line and the second break line.

8. The method according to claim 7, wherein the first and second panels are arranged so that the gelatin coating is positioned between the first and second panels.

9. The method according to claim 7, further comprising the step of:
   producing the predetermined break point using a scoring procedure.

10. The method according to claim 7, wherein the first and second panels are composed of a glass material.

11. The method according to claim 7, wherein the step of applying the protective layer includes the step of sputtering the protective layer.

12. The method according to claim 7, wherein the protective layer is composed of an indium-tin oxide.

13. The method according to claim 7, wherein the dry etching procedure is performed by a reactive ion etching using an $O_2$—Ar—$SF_6$ gas mixture.

14. The method according to claim 7, wherein the gelatin layer is configured as a photoemulsion.

15. The method according to claim 7, wherein the gelatin layer is configured as a colored photoemulsion.

16. The method according to claim 7, further comprising the step of:
   applying an orientation layer onto the protective layer.

* * * * *